US006959583B2

(12) United States Patent  
Platt

(10) Patent No.: US 6,959,583 B2
(45) Date of Patent: Nov. 1, 2005

(54) PASSIVE TEMPERATURE COMPENSATION TECHNIQUE FOR MEMS DEVICES

(75) Inventor: William Platt, Columbia Heights, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/135,538

(22) Filed: Apr. 30, 2002

(65) Prior Publication Data

US 2003/0200785 A1   Oct. 30, 2003

(51) Int. Cl.[7] .......................... G01P 21/00; G01P 15/097
(52) U.S. Cl. ..................................... 73/1.37; 73/504.12
(58) Field of Search ............................ 73/1.37, 504.12, 73/504.14, 514.29

(56) References Cited

U.S. PATENT DOCUMENTS

| 5,241,861 A | | 9/1993 | Hulsing, II |
| 5,349,855 A | | 9/1994 | Bernstein et al. ............. 73/505 |
| 5,361,637 A | * | 11/1994 | Judd et al. ..................... 73/766 |
| 5,438,410 A | | 8/1995 | Killpatrick et al. |
| 5,488,862 A | | 2/1996 | Neukermans et al. |
| 5,530,342 A | * | 6/1996 | Murphy .................... 324/158.1 |
| 5,635,638 A | * | 6/1997 | Geen ........................ 73/504.04 |
| 5,756,895 A | | 5/1998 | Kubena et al. |
| 5,806,364 A | | 9/1998 | Kato et al. |
| 5,872,313 A | | 2/1999 | Zarabadi et al. |
| 5,895,851 A | | 4/1999 | Kano et al. ................ 73/504.04 |
| 5,908,986 A | * | 6/1999 | Mitamura ................. 73/504.12 |
| 5,920,012 A | | 7/1999 | Pinson ..................... 73/504.12 |
| 5,987,986 A | | 11/1999 | Wyse et al. |
| 6,109,105 A | | 8/2000 | Kubena et al. |
| 6,122,961 A | | 9/2000 | Geen et al. |
| 6,236,281 B1 | * | 5/2001 | Nguyen et al. ............. 331/154 |

(Continued)

FOREIGN PATENT DOCUMENTS

| EP | 0 661 521 A1 | 7/1995 | .......... G01C 19/56 |
| EP | 0 675 340 A1 | 10/1995 | .......... G01C 19/56 |
| WO | WO 01/27026 A1 | 4/2001 | ............ B81B 3/00 |

OTHER PUBLICATIONS

White, Robert D., "Effects of Impact and Vibration on the Performance of a Micromachined Tuning Fork Gyroscope," Thesis, Massachusetts Institute of Technology, Jun. 1999, pp. 1-55.

"Overview—Electronics for Coriolis Force and Other Sensors/Patent No. 5481914, Issued Jan. 9, 1996," date unknown, pp. 1-2.

Shakouri, Ali, based on the notes by Petersen, Stephen, University of California, Santa Cruz, Electrical Engineering Department, Analog Electronics Laboratory, date unknown, pp. 1-4.

(Continued)

*Primary Examiner*—Charles Garber
(74) *Attorney, Agent, or Firm*—McDonnell Boehnen Hulbert & Berghoff LLP

(57) ABSTRACT

In an exemplary embodiment, a MEMS sensor using a passive temperature compensation technique may provide an uncompensated sense output. Additionally, a circuit coupled to the MEMS sensor may include a diode having a voltage drop. A compensated sense output may be formed by combining the uncompensated sense output with a diode output that is proportional to the voltage drop across the diode.

14 Claims, 4 Drawing Sheets

U.S. PATENT DOCUMENTS

| | | | |
|---|---|---|---|
| 6,251,698 B1 | 6/2001 | Lefort et al. | 438/22 |
| 6,267,008 B1 | 7/2001 | Nagao | |
| 6,272,925 B1 | 8/2001 | Watson | |
| 6,311,555 B1 | 11/2001 | McCall et al. | |
| 6,311,556 B1 * | 11/2001 | Lefort et al. | 73/514.29 |
| 6,430,403 B1 * | 8/2002 | Kossor | 455/126 |

OTHER PUBLICATIONS

"Switching Time of a Diode," http://www.csee.umbc.edu/~plusquel/v1sill/slides/diode3.html , Jan. 24, 2002, pp. 1-12.

International Search Report for PCT/US03/13308 mailed Dec. 12, 2003.

* cited by examiner

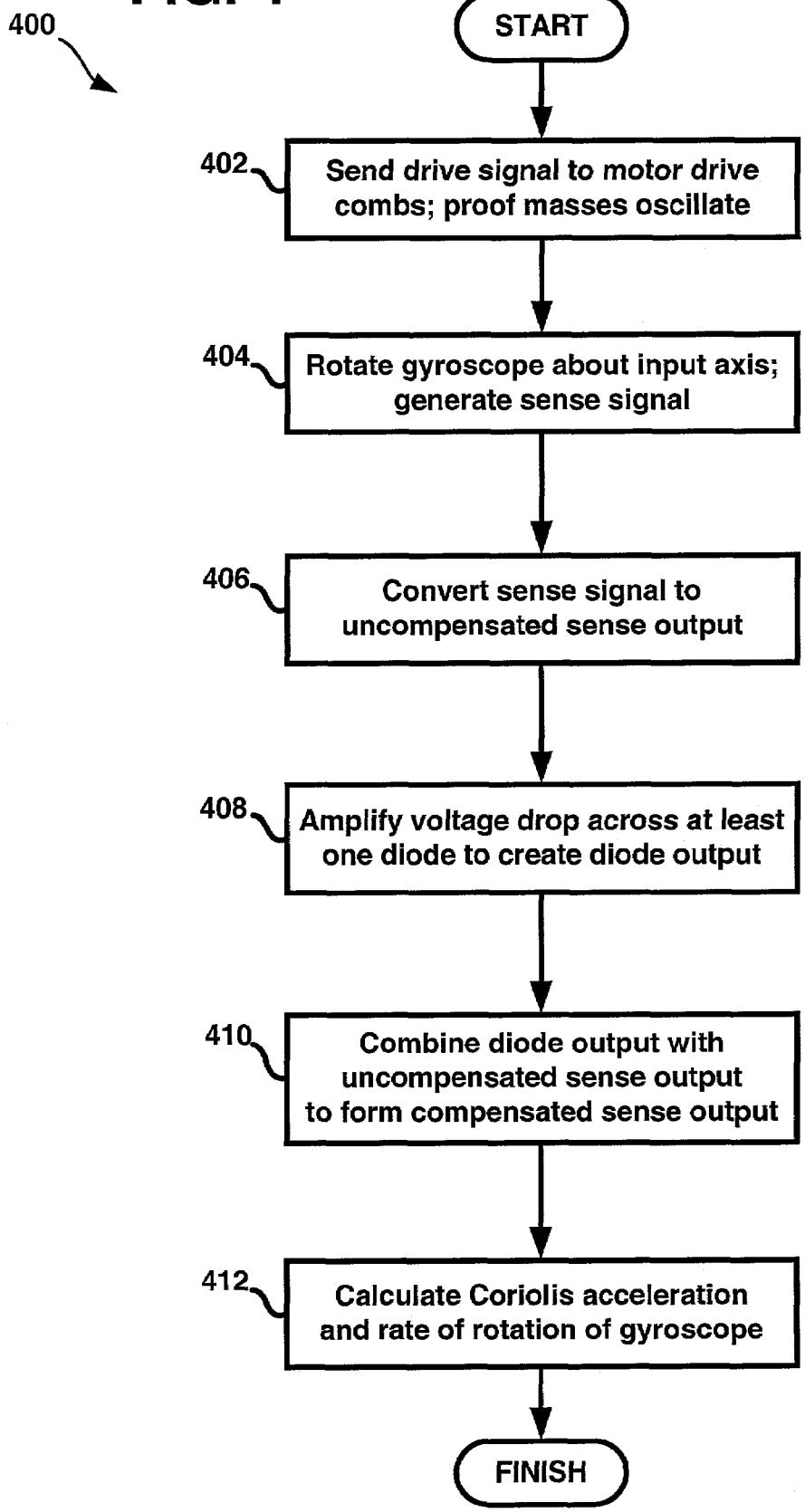

US 6,959,583 B2

PASSIVE TEMPERATURE COMPENSATION TECHNIQUE FOR MEMS DEVICES

FIELD

The present invention relates generally to MEMS sensors, and more particularly, relates to a passive temperature compensation technique for MEMS sensors.

BACKGROUND

Microelectromechanical systems (MEMS) have the potential to transform a number of different industries in modern society. Ranging from aerospace to bioengineering, the impact of MEMS is likely to be as profound and pervasive as that of integrated circuits. In particular, the use of MEMS devices as sensors and actuators in electromechanical systems is very promising. By creating electrical and mechanical components on a silicon substrate using standard microfabrication techniques, MEMS technology enables relatively small, cheap, and accurate sensing devices to be created. MEMS sensors and actuators are already being used in numerous commercial devices, including automobile airbag accelerometers and vibration sensors.

A common application of MEMS sensors has also been in the use of gyroscopes, which may use the motion of a vibrating element to measure an angular rate of rotation. A variety of MEMS gyroscopes are commercially available, including tuning fork gyroscopes and angular rate sensing gyroscopes. In the case of tuning fork gyroscopes, three orthogonal axes (drive, input, and sense) may be utilized to describe gyroscope motion. When a tuning fork gyroscope is in operation, a vibrating element may be placed in oscillatory motion along the direction of the drive axis while the gyroscope rotates about the input axis. These motions may result in a Coriolis acceleration that can be measured along the direction of the sense axis. Using a well-known mathematical relationship, the angular rate of rotation of the gyroscope about the input axis may then be calculated.

Despite the advantages of MEMS technology, prior art MEMS sensors often face a number of drawbacks. MEMS sensors may have performance characteristics such as voltage outputs that are sensitive to temperature changes. To reduce this sensitivity, a prior art MEMS sensor is often tested in a thermal chamber to measure its output at a variety of different temperatures. Complicated regression analysis (e.g., using cubic or fifth order functions) may then be utilized to map the thermal sensitivity of the MEMS sensor. The coefficients obtained from the regression analysis may subsequently be stored within a microprocessor and provided to the MEMS sensor while in operation to compensate for temperature changes. Thus, a number of complicated components may be required for reducing the thermal sensitivity of a prior art MEMS sensor.

Accordingly, it is desirable to have a MEMS sensor that overcomes the above deficiencies associated with the prior art. This may be achieved by utilizing a passive temperature compensation technique for improved performance of a MEMS sensor.

SUMMARY

A system and method having a microelectromechanical system (MEMS) sensor using a passive temperature compensation technique are provided. In an exemplary embodiment, a circuit coupled to the MEMS sensor may include at least one diode having a voltage drop. Further, a compensated sense output may be formed by combining an uncompensated sense output with a diode output.

BRIEF DESCRIPTION OF THE DRAWINGS

Presently preferred embodiments are described below in conjunction with the appended drawing figures, wherein like reference numerals refer to like elements in the various figures, and wherein:

FIG. 4 illustrates a flow chart showing a method of measuring the rate of rotation of the MEMS gyroscope of FIG. 1, according to an exemplary embodiment.

DETAILED DESCRIPTION

Figure 1:
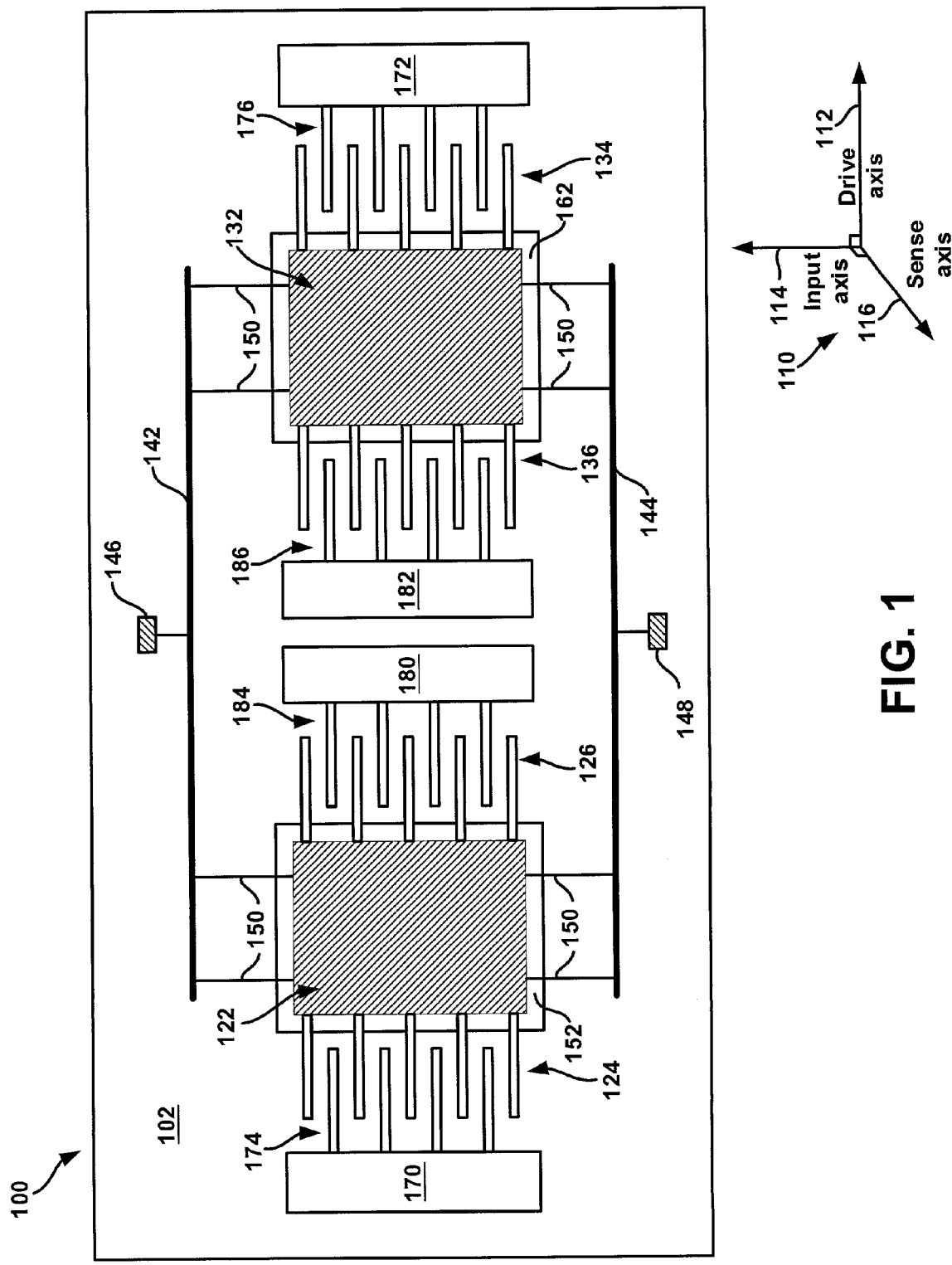
FIG. 1 illustrates a plan view of an exemplary MEMS gyroscope.

Referring to FIG. 1, an exemplary plan view of a MEMS gyroscope 100 is shown. In the present embodiment, the MEMS gyroscope 100 is a tuning fork gyroscope, but it should be understood that other types of MEMS gyroscopes (e.g., angular rate sensing gyroscopes) or MEMS sensors may also be utilized. The exemplary MEMS gyroscope 100 includes a substrate 102 from which the other components of the gyroscope 100 may be micromachined. The substrate 102 may be silicon or any other material known in the art usable in micromachining processes, such as gallium arsenide, glass, or other materials common to the integrated circuit industry. Also shown in FIG. 1 are a set of orthogonal axes 110 that may be used to describe the motion of the gyroscope 100 and its components. Preferably, a drive axis 112 and input axis 114 are parallel to the surface of the substrate 102, and a sense axis 116 is perpendicular to the surface of the substrate 102. Additionally, the exemplary gyroscope 100 may include a first proof mass 122 and a second proof mass 132, hereinafter collectively referred to as "proof masses 122, 132"; cross beams 142, 144; anchors 146, 148; a plurality of support beams 150; a first sense plate 152 and a second sense plate 162, hereinafter collectively referred to as "sense plates 152, 162"; a first motor drive comb 170 and a second motor drive comb 172, hereinafter collectively referred to as "motor drive combs 170, 172"; and a first motor pickoff comb 180 and a second motor pickoff comb 182, hereinafter collectively referred to as "motor pickoff combs 180, 182".

In the present embodiment, the proof masses 122, 132 may be connected to the cross beams 142, 144 by the plurality of support beams 150. The proof masses 122, 132 may be silicon plates or any other type of material suitable for use in a MEMS gyroscope system. Although not shown, the proof masses 122, 132 may contain holes (e.g., square openings) through which a fluid or gas (e.g., air) may pass, which may help reduce thin film damping effects. As will be described below, the movement of the proof masses 122, 132 may be utilized to detect the rotation of the gyroscope 100 along the input axis 114.

In addition, the first proof mass 122 may have first proof mass electrodes 124, 126 that extend towards the first motor drive comb 170 and first motor pickoff comb 180, respectively. Similarly, the second proof mass 132 may have second proof mass electrodes 134, 136 that extend towards the second motor drive comb 172 and second motor pickoff comb 182, respectively. The first proof mass electrodes 124, 126 and second proof mass electrodes 134, 136 hereinafter may be collectively referred to as "proof mass electrodes 124, 126, 134, 136". The proof mass electrodes 124, 126, 134, 136 may be any conductive or semiconductive material that may be utilized to create an electrical contact, and may be micromachined directly out of the silicon substrate 102. Further, it should be understood that any number of electrodes may be utilized with the proof mass electrodes 124, 126, 134, 136.

FIG. 1 also shows cross beams 142, 144 connected to the substrate 102 by anchors 146, 148, respectively. The cross beams 142, 144 may be rigid rods that have been micromachined out of the substrate 102 using standard microfabrication processes (e.g., photolithography, chemical etching, etc.). The anchors 146, 148 may connect the cross beams 142, 144 to the substrate 102.

Similar to the cross beams 142, 144 and proof masses 122, 132, the plurality of support beams 150 may be micromachined from the substrate 102. Further, the plurality of support beams 150 may act as springs and enable the proof masses 122, 132 to oscillate along the direction of the drive axis 112. The spring-like nature of the plurality of support beams 150 may also enable the proof masses 122, 132 to move along the direction of the sense axis 116. Thus, depending on the motion of the gyroscope 100, the distance between the proof masses 122, 132 and the substrate 102 may vary. It should be understood that although eight support beams 150 are shown in the present embodiment, any number of support beams may be utilized.

The gyroscope 100 may also include sense plates 152, 162 located substantially underneath the proof masses 122, 132, respectively, on the surface of the substrate 102. In the present embodiment, the sense plates 152, 162 are silicon plates micromachined out of the substrate 102. Alternatively, the sense plates 152, 162 may be any conductive or semiconductive material known in the art. Preferably, the sense plates 152, 162 operate as capacitors with the proof masses 122, 132, respectively. As described later, changes in capacitance between the sense plates 152, 162 and proof masses 122, 132 may be utilized for detecting the Coriolis acceleration of the proof masses 122, 132 along the sense axis 116. The Coriolis acceleration may in turn be utilized to calculate a rate of rotation for the gyroscope 100 about the input axis 114.

Further, as shown in FIG. 1, the gyroscope 100 also includes motor drive combs 170, 172 having a plurality of interdigitated drive comb electrodes 174, 176, respectively. In the present embodiment, the plurality of interdigitated drive comb electrodes 174, 176 may form capacitors with the first proof mass electrode 124 and second proof mass electrode 134, respectively. Any number of electrodes may be utilized for the drive comb electrodes 174, 176.

The motor drive combs 170, 172 may also be connected to drive electronics (not shown in FIG. 1). The drive electronics may provide one or more drive signals to the motor drive combs 170, 172 and cause the proof masses 122, 132 to oscillate along the drive axis 112. In the present embodiment, both motor drive combs 170, 172 may receive a drive signal at the same frequency. However, these drive signals may be out of phase (e.g., by one-hundred and eighty (180) degrees).

Turning now to another component within the gyroscope 100, the motor pickoff combs 180, 182 may have a plurality of interdigitated pickoff comb electrodes 184, 186, respectively. In the present embodiment, the plurality of interdigitated pickoff comb electrodes 184, 186 may form capacitors with the first proof mass electrode 126 and second proof mass electrode 136, respectively. The motor pickoff combs 180, 182 may detect a pickoff signal (e.g., current) that is induced by changes in the capacitance between the pickoff comb electrodes 184, 186 and the first proof mass electrode 126 and second proof mass electrode 136, respectively. The pickoff signal may be subsequently utilized for determining the motion and velocity of the proof masses 122, 132. Additionally, the pickoff signal may be transferred by the motor pickoff combs 180, 182 to the drive electronics as part of a feedback loop. In an exemplary embodiment, the pickoff signal may be used by the drive electronics for determining whether the proof masses 122, 132 are oscillating at the proper frequency (e.g., tuning fork frequency), amplitude, and phase. The drive electronics may then change characteristics of the drive signal (e.g., pulse width, frequency, phase, etc.) if the motion of the proof masses 122, 132 should be altered.

It should be understood that any number of the previously described elements may be utilized with the present embodiment, depending on their desired functionality. For example, in alternate embodiments, any number of drive comb electrodes 174, 176, pickoff comb electrodes 184, 186, motor drive combs 170, 172 and/or motor pickoff combs 180, 182 may be utilized. Furthermore, in alternate embodiments, only one motor pickoff comb may be utilized, or the positions of the motor drive combs 170, 172 and motor pickoff combs 180, 182 may be switched. Additionally, the components of the gyroscope 100 may be created from different materials and connected separately to the substrate 102 rather than being micromachined from the substrate 102, and more or fewer components may be utilized for the gyroscope 100 than described in the present embodiment.

Having described the structure and connectivity of the gyroscope 100, a brief explanation may illustrate how the gyroscope 100 functions. In the present embodiment, the MEMS gyroscope 100 is capable of measuring the rate of rotation about the input axis 114. When functioning, the proof masses 122, 132 of the gyroscope 100 are driven substantially at the tuning fork frequency by a drive signal, which may cause the proof masses 122, 132 to oscillate along the direction of the drive axis 112. While the proof masses 122, 132 are oscillating, the gyroscope 100 may be rotated about the input axis 114. As known in the art, an oscillating element may undergo a Coriolis acceleration when it is rotated about an axis orthogonal to the direction of its oscillation.

Therefore, the movement of the gyroscope may result in a Coriolis acceleration along the direction of the sense axis 116, causing the distance and capacitance between the proof masses 122, 132 and the sense plates 152, 162 to vary. Through this change in capacitance, the Coriolis acceleration of the proof masses 122, 132 may be calculated. The following cross-product relationship may then be utilized to calculate the angular rate of rotation of the gyroscope:

$$A_{Coriolis} = 2\Omega \times v,$$

where $A_{Coriolis}$=resulting Coriolis acceleration along the sense axis 116, $\Omega$=rate of rotation of the gyroscope about the input axis 114, and v=drive velocity of the proof masses 122, 132 along the drive axis 112. The drive velocity of the proof masses may be determined from a pickoff signal obtained from the motor pickoff combs 180, 182. The drive velocity and the measured Coriolis acceleration may then be utilized to determine the rate of rotation of the gyroscope 100.

Figure 2:
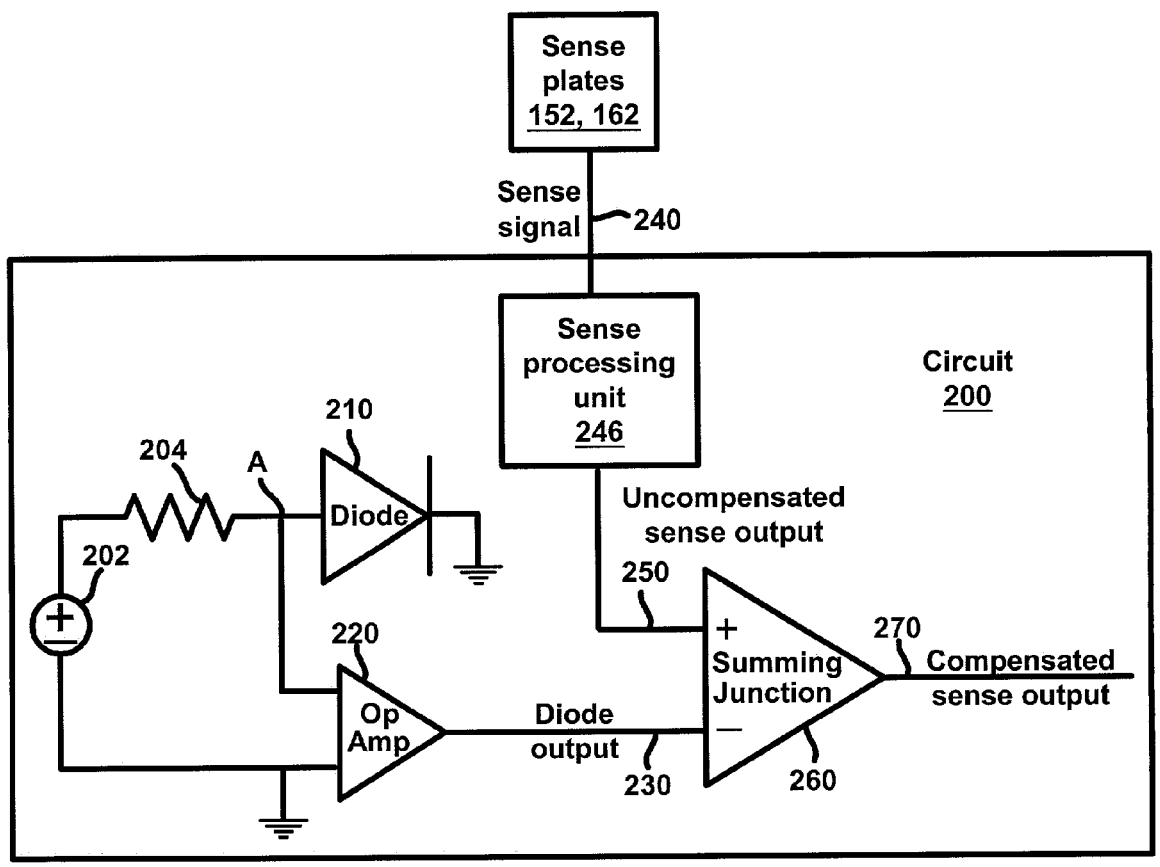
FIG. 2 illustrates a circuit for use with the MEMS gyroscope of FIG. 1, according to an exemplary embodiment.

Turning now to FIG. 2, an exemplary circuit 200 for use with the MEMS gyroscope 100 is shown. The circuit 200 may include a direct current (DC) voltage source 202 in series with a resistor 204. The DC voltage source 202 may have any voltage (e.g., 5 volts) and may be used to provide power to the circuit 200. Additionally, the resistor 204 may have any resistance (e.g., 100 kilo-ohms) and may be used to set an upper limit on the amount of current that passes through the circuit 200. Furthermore, the resistor 204 may be connected to at least one diode 210. The input of the at least one diode 210 may be provided to at least one operational amplifier 220, which may have any gain (e.g., 100). A diode output 230 may be formed within the circuit 200 by amplifying a voltage drop across the at least one diode 210 (e.g., the potential at node "A") by the at least one operational amplifier 220. It should be understood that in alternate embodiments, more or fewer circuit components, such as voltage sources, resistors, diodes, and/or operational amplifiers, may be utilized.

In the present embodiment, the circuit 200 may receive a sense signal 240 from the sense plates 152, 162 of the MEMS gyroscope 100. The sense signal 240 may be an AC current that is induced by a change in capacitance between the proof masses 122, 132 and the sense plates 152, 162, respectively. As described earlier, this change in capacitance may be caused by a Coriolis acceleration of the proof masses 122, 132.

Additionally, the sense signal 240 may be converted into an uncompensated sense output 250 by a sense processing unit 246. The uncompensated sense output 250 may be a direct current (DC) voltage that reflects the average magnitude of the sense signal 240. The sense processing unit 246 may first convert the sense signal 240 into an AC voltage, and the AC voltage may then be converted into the uncompensated sense output 250. Various processes, such as amplification, demodulation, and/or filtering, may be utilized while converting the sense signal 240 (e.g., AC current) to the uncompensated sense output 250 (e.g., DC voltage), and the sense processing unit 246 may contain any number of filters, diodes, capacitors, and/or other circuit elements. It should be understood that the composition of the sense signal 240, sense processing unit 246 and/or uncompensated sense output 250 may vary in alternate embodiments.

Further, the diode output 230 and uncompensated sense output 250 may be provided to a summing junction 260. The summing junction 260 may either add or subtract the diode output 230 and the uncompensated sense output 250, depending on polarity. In the present embodiment, the summing junction 260 may reduce the magnitude of the uncompensated sense output 250 by adding the diode output 230, creating a compensated sense output 270.

Although the summing junction 260 is shown as an operational amplifier in FIG. 2, any other device that can combine signals (e.g., other types of transistor circuits) may alternatively be utilized. Further, although the diode output 230 and the uncompensated sense output 250 are shown entering the inverting and non-inverting inputs of the summing junction 260, respectively, this may also vary in alternate embodiments.

In the present embodiment, the circuit 200 may be exposed to the same external temperature as the MEMS gyroscope 100, and the voltage drop across the at least one diode 210 (e.g., potential at node "A") may have a similar temperature dependency as the sense signal 240 of the MEMS gyroscope 100. Further, the gain of the at least one operational amplifier 220 maybe set so that the magnitude of the diode output 230 compensates the sense signal 240 for changes caused by temperature fluctuations. Hence, the diode output 230 may be combined with the uncompensated sense output 250 at the summing junction 260 to compensate for changes caused by the thermal sensitivity of the MEMS gyroscope 100. The resulting compensated sense output 270 may therefore closely approximate (e.g., to the first or second degree) the output of a substantially non-temperature sensitive MEMS gyroscope 100. Additionally, since the circuit 200 may be created at minimal additional cost to the MEMS gyroscope 100, the compensated sense output 270 may provide a cheap and efficient way of maintaining a relatively robust output of the MEMS gyroscope 100 during temperature fluctuations. It should be understood that the passive temperature compensation technique described here may also be utilized with any other type of MEMS sensor in any other type of MEMS application (e.g., automotive system sensors).

Figure 3:
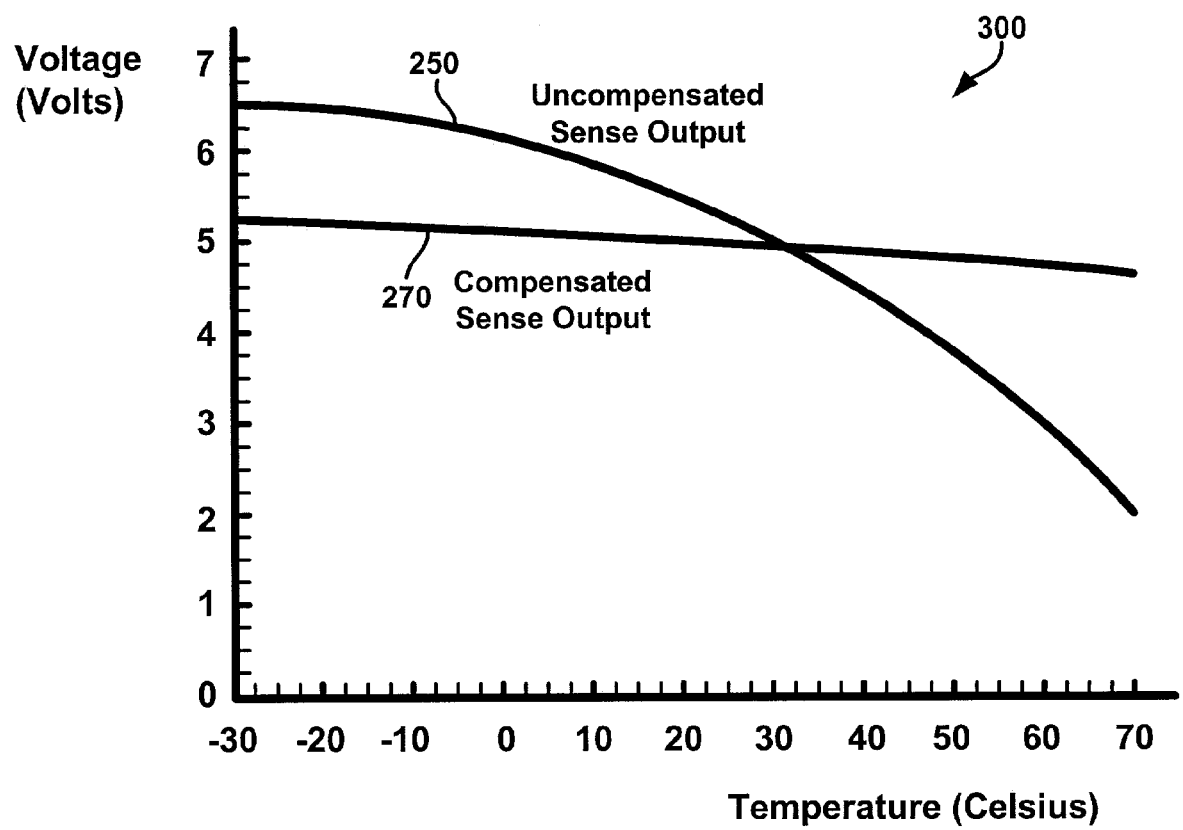
FIG. 3 illustrates a graph showing an uncompensated sense output and compensated sense output of the circuit of FIG. 2 for use with the MEMS gyroscope of FIG. 1, according to an exemplary embodiment.

FIG. 3 illustrates a simplified graph 300 showing both the uncompensated sense output 250 and the compensated sense output 270 of the circuit 200. As shown in FIG. 2, the compensated sense output 270 may be determined by combining the uncompensated sense output 250 with a diode output 230 that is proportional to the voltage drop across the at least one diode 210. As shown in FIG. 3, the uncompensated sense output 250 may drop more significantly than the compensated sense output 270 as the temperature increases. In the present embodiment, the uncompensated sense output 250 and compensated sense output 270 may have voltages of 6.5 volts and 5.25 volts, respectively, at −30 degrees Celsius, and 3 volts and 4.75 volts, respectively, at 60 degrees Celsius. It should be understood that the voltages and temperatures associated with the uncompensated sense output 250 and compensated sense output 270 as shown in FIG. 3 are merely exemplary and may vary greatly in alternate embodiments depending on the type and temperature of the MEMS application.

Turning now to FIG. 4, a flow chart illustrates an exemplary method 400 of measuring a rate of rotation of the MEMS gyroscope 100. The method 400 begins with step 402, where a drive signal may be sent to the motor drive combs 170, 172 of the MEMS gyroscope 100. The drive signal may cause the proof masses 122, 132 to oscillate along the drive axis 112 at substantially the tuning fork frequency.

In step 404, the gyroscope 100 may rotate about the input axis 114. This rotation may cause a Coriolis acceleration to be induced along the sense axis 116. Also in the present step 404, the sense signal 240 may be generated on the sense plates 152, 162 in response to the change in capacitance between the proof masses 122, 132 and the sense plates 152, 162, respectively.

In step 406, the sense signal 240, which may be an AC current, may be converted into an uncompensated sense output 250 by the sense processing unit 246. The uncompensated sense output 250 may be a DC voltage that represents the average magnitude of the sense signal 240. Additionally, the sense processing unit 246 may amplify, demodulate, and/or filter the sense signal 240 in order to create the uncompensated sense output 250.

In step 408, a current may pass through the circuit 200, and a voltage drop across the at least one diode 210 may be amplified by the at least one operational amplifier 220 in order to create the diode output 230.

In step 410, the diode output 230 may be combined with the uncompensated sense output 250 within the summing junction 260 to form the compensated sense output 270. Depending on the implementation of the embodiment, the summing junction 260 may take either the sum or difference of the diode output 230 and the uncompensated sense output 250. In the present embodiment, the summing junction 260 may reduce the magnitude of the uncompensated sense output 250 by the magnitude of the diode output 230 in order to create the compensated sense output 270.

In step 412, the compensated sense output 270 may be utilized for calculating the Coriolis acceleration of the proof masses 122, 132. The Coriolis acceleration may then be utilized to calculate a rate of rotation of the MEMS gyroscope 100. It should be understood that any of the steps in the present method 400 may occur simultaneously or in a different order. For example, steps 406 and 408 may occur independently and/or in a different order (e.g., simultaneously) in another exemplary method.

The exemplary embodiments presented here may have numerous advantages. By utilizing relatively simple and inexpensive circuitry, such as the circuit 200, the thermal sensitivity of a MEMS sensor (e.g., MEMS gyroscope 100) may be greatly reduced. Thus, the present embodiments may enable a MEMS sensor to operate more accurately than an uncompensated sensor across a range of temperatures and at lower cost than thermal calibration. Additionally, although the present embodiments may be useful for all types of MEMS sensors in all types of MEMS applications (e.g., MEMS accelerometers, other types of MEMS gyroscopes), low-end MEMS applications including certain automotive or navigation system sensors may especially benefit.

It should be understood that a wide variety of additions and modifications may be made to the exemplary embodiments described within the present application. For example, a number of MEMS gyroscopes may be used in combination in order to measure the rotation of a device along a number of different axes. In addition, any type of MEMS gyroscope and/or MEMS sensor may be utilized with the present embodiments. Additionally, a variety of different materials may be used for the components of the gyroscope 100 depending on their desired functionality. Furthermore, any number of embodiments within the present application may be combined, depending on consumer and/or manufacturing preferences. In addition, more or fewer elements may be present within the gyroscope 100 and circuit 200, and the circuit 200 may be integral with the MEMS gyroscope 100. To illustrate, more diodes and/or transistors may be utilized with the present embodiment for a higher order of temperature compensation. It is therefore intended that the foregoing description illustrates rather than limits this invention and that it is the following claims, including all equivalents, which define this invention.

What is claimed is:

1. A system for providing a passive temperature compensation technique to a microelectromechanical system (MEMS) gyroscope, comprising in combination:
a MEMS gyroscope having an uncompensated sense output that is sensitive to temperature changes, wherein the uncompensated sense output is a voltage output;
a circuit coupled to the MEMS gyroscope, wherein the circuit includes a diode having an associated voltage drop, and wherein the diode has a temperature dependency that is substantially the same as the uncompensated sense output of the MEMS gyroscope; and
a compensated sense output formed by combining the uncompensated sense output of the MEMS gyroscope and a diode output associated with the voltage drop of the diode.

2. The system of claim 1, wherein the voltage drop across the at least one diode is amplified by at least one operational amplifier and converted to the diode output.

3. The system of claim 1, wherein the MEMS gyroscope comprises a proof mass that oscillates in response to a drive signal.

4. The system of claim 3, wherein a Coriolis acceleration is generated in response to a rotation of the MEMS gyroscope, and the Coriolis acceleration is utilized for measuring a rate of rotation of the MEMS gyroscope.

5. The system of claim 3, wherein a change in capacitance between the proof mass and a sense plate generates a sense signal.

6. The system of claim 5, wherein the sense signal is converted to the uncompensated sense output.

7. The system of claim 5, wherein a sense processing unit demodulates and filters the sense signal to form the uncompensated sense output.

8. The system of claim 7, wherein the amplitude of the sense signal determines the uncompensated sense output.

9. The system of claim 1 further comprising a summing junction, wherein the summing junction combines the uncompensated sense output with the diode output to form the compensated sense output.

10. The system of claim 9, wherein the summing junction comprises an operational amplifier.

11. A system for providing a passive temperature compensation technique to a MEMS gyroscope, comprising in combination:
the MEMS gyroscope providing a sense signal that is sensitive to temperature changes;
a sense processing unit coupled to the MEMS gyroscope operable to convert the sense signal into an uncompensated sense output, wherein the uncompensated sense output is a DC voltage signal;
at least one diode having a voltage drop, wherein the diode has a temperature dependency that is substantially the same as the uncompensated sense output;
at least one operational amplifier operable to amplify the voltage drop of a diode output; and
a summing junction operable to combine the diode output with the uncompensated sense output to form a compensated sense output.

12. The system of claim 11, wherein the sense processing unit amplifies, demodulates, and filters the sense signal to form the uncompensated sense output.

13. The system of claim 11, wherein the MEMS gyroscope comprises a proof mass and a sense plate, and a change in capacitance between the proof mass and the sense plate generates the sense signal.

14. The system of claim 13, wherein the compensated sense output is used to calculate a Coriolis acceleration of the proof mass, and the Coriolis acceleration is used with a drive velocity of the proof mass to calculate a rate of rotation of the MEMS gyroscope.

* * * * *